Jan. 30, 1934.　　　　I. H. WILSON　　　　1,945,301
GUARD FOR MOWING AND ANALOGOUS MACHINES
Filed July 21, 1933　　　2 Sheets-Sheet 1

Inventor
I. H. Wilson

By Clarence A. O'Brien
Attorney

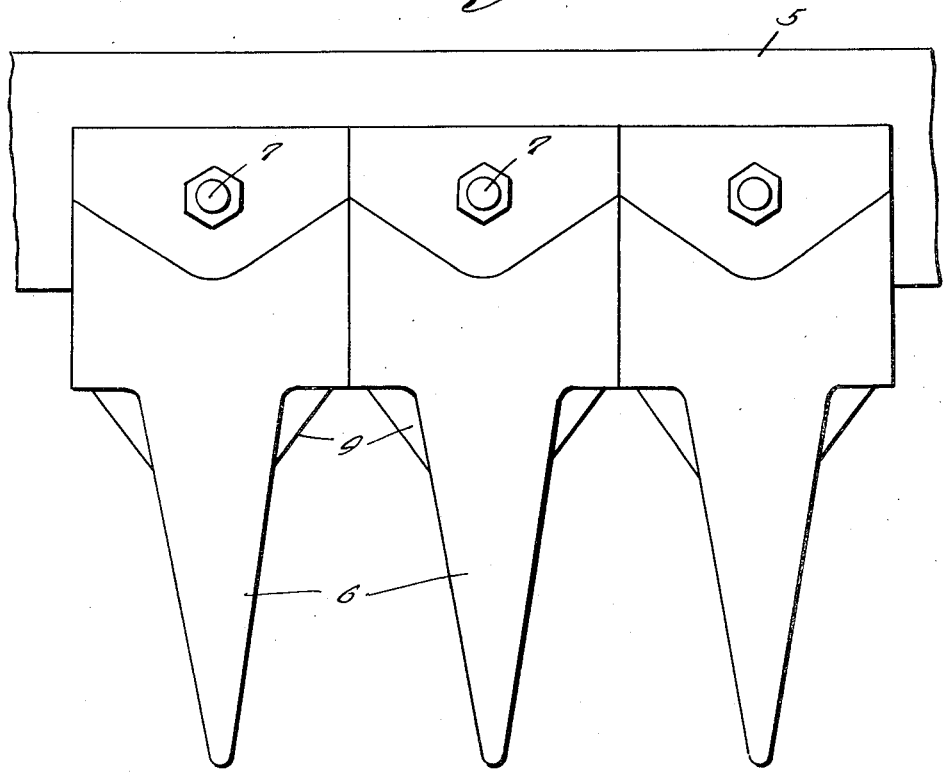
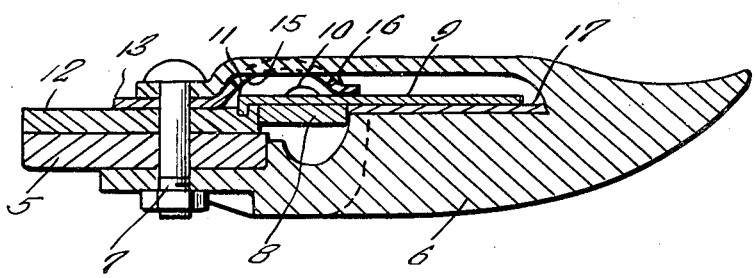

Patented Jan. 30, 1934

1,945,301

UNITED STATES PATENT OFFICE 1,945,301

GUARD FOR MOWING AND ANALOGOUS MACHINES

Ira Herbert Wilson, Montreal, Mo.

Application July 21, 1933. Serial No. 681,621

3 Claims. (Cl. 56—309)

This invention relates to the knife or sickle guard of mowers, reamers, harvesters and all such sickle using machines, and the invention has particular reference to means for maintaining at all times the sickle or cutting knives in positive and efficient cutting relation with respect to the ledger plate of the knife guard.

It is therefore an object of the present invention to provide a device adapted for ready application to the mower or analogous machine, and which when applied will maintain a yielding pressure on the sickle or cutting knives to secure between the cutting knives and the ledger plate a cooperative cutting operation similar to that obtained by the blades of a scissors.

The invention together with its objects and advantages will be best understood from a study of the following description taken in connection with the accompanying drawings wherein is illustrated a preferred embodiment of the invention.

It is to be understood at the outset that it is in no wise intended to restrict the invention to the precise details of construction, combination and arrangement of elements as specifically herein illustrated and described, other than may be necessary to meet the requirements of the prior art and scope of the appended claims.

In the drawings:

Figure 2 is a bottom plan view thereof.

Figure 3 is a longitudinal section of one of the guard fingers, and

Figure 1:
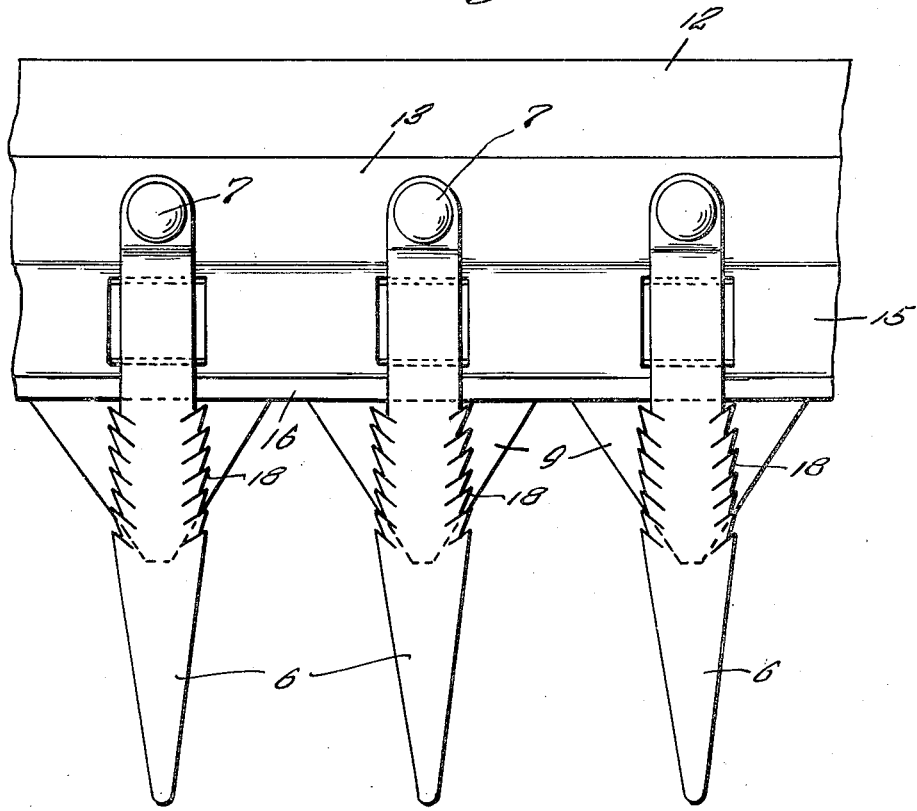
Figure 1 is a plan view of a portion of a cutting apparatus having my improvements embodied therein.
Figure 4:
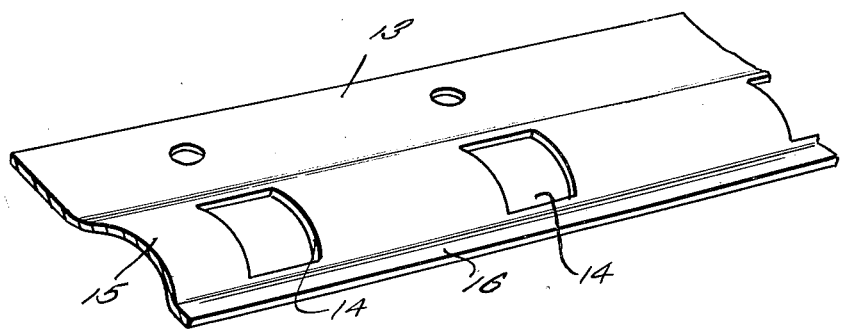
Figure 4 is a perspective view of a portion of the improved guide and keeper plate forming part of the invention.

Referring to the drawings by reference numerals it will be seen that 5 designates the stationary or finger bar to which a series of guard fingers 6 are secured by means of bolts 7 or otherwise, such fingers being provided with suitable ways in which is mounted a reciprocating cutter bar 8. The bar 8 carries the usual sickle or cutting knives 9 and in the present instance the knives 9 are secured to the bar 8 by suitable fastening means 10. At their rear edges the knives 9 extend laterally of the bar 8 and have downturned portions or flanges 11 operating in a longitudinal groove provided in the forward edge of a metallic guide bar or strip 12 fixedly secured to the top side of the bar 5 in any suitable manner.

Further in accordance with the present invention there is provided an elongated keeper plate 13 that is secured to the top face of the bar 12 by bolts, rivets, or other suitable fastening means 7. The keeper plate 13 has an intermediate portion thereof transversely curved or bowed as at 15 whereby it will be raised out of contact with the inner end of the movable knives 9. At its forward edge the part 15 of the keeper plate 13 merges into a longitudinal flange or lip 16 which resiliently bears against the knives 9 serving to hold the movable knives 9 close to the stationary knives or ledger plates 17 with which the guard fingers 6 are provided as is common with cutting machines of this type.

In actual practice it will be found that the inter-engagement between the stationary bar 12 and the knives 9 provides for an efficient guiding of the knives 9 in their reciprocatory movement while the provision of the plate 13 with its integral lip or flange 16 having yielding contact with the knives 9 will serve to prevent in an efficient manner, knives 9 from rising while at work and thus maintain, at all times, the tapered or cutting edges of the knives 9 in proper shearing relation with respect to the stationary knives or ledger plates 17.

Further in accordance with the present invention each of the guard fingers 6 is provided with the usual upper rearwardly-extending shield or fender 18, adapted to protect the knife-blade and to provide an upper edge at each side against which the grass, etc., may bear under the action of the knives. However, the said fender or shield 18, as an improvement over the fender or shield now used on a guard finger, is provided with serrations in its side edges, the serrations forming teeth to engage the grass or the like to insure the holding of the grass or the like in proper position for shearing.

As will be also noted the shields or fenders 18 extend rearwardly, and at their rear ends are offset downwardly and apertured to accommodate the bolts 7 whereby the fingers 6 are secured in an efficient manner on the cutter. Also, the portion 15 of the keeper plate 13 is provided with apertures 14 to accommodate the rearwardly extending parts of the shield 18 as clearly shown in the drawings.

Having thus described my invention, what I claim as new is:—

1. In a cutting mechanism for mowers and analogous machines, a stationary bar, guard fingers secured at their rear portions to said bar, and provided with ways, a reciprocatory bar operating within the ways of the guard fingers, a series of knives fixedly mounted on the reciprocating bar and having rear portions extending laterally of said bar and provided with depending flanges, a guide bar fixedly mounted on the stationary bar and having a groove adjacent its forward edge in which the depending flanges of said knives operate, and a keeper bar extending longitudinally of the guide bar and secured thereto, said keeper bar having an intermediate portion raised out of engagement with said knives, and a forward portion having resilient bearing engagement with said knives forwardly of the fixed mounting of the knives on the reciprocating bar.

2. In a cutting mechanism of the kind described, a support, a guard finger having a rear portion secured to the support, a guide bar on the support and having a groove in its upper face, a reciprocating sickle bar, cutter knives carried by said sickle bar, and said cutter knives having rear portions provided with depending flanges operating in the groove of the guide bar for guiding said knives and sickle bar during reciprocation of the latter.

3. In a cutting mechanism of the class described, a stationary bar, spaced guard fingers extending forwardly from said bar, and provided with ways for accommodating a reciprocating bar, a sickle bar mounted for reciprocation within said ways and having knives, a keeperbar mounted on the stationary bar and having a raised intermediate portion and a forward portion having bearing engagement with the knives of the sickle bar, upper rearwardly extending shields on the guard fingers having ends overlying the stationary bar, bolts extending through said ends of the shields, said stationary bar and the rear portions of the fingers for securing the fingers and keeper bar in position on the stationary bar, said keeper bar having apertures in the rear portions thereof for accommodating the parts of the shield overlying said raised portion of the keeper bar.

IRA HERBERT WILSON.